United States Patent [19]
F'Geppert
[11] Patent Number: 4,596,404
[45] Date of Patent: Jun. 24, 1986

[54] OUTRIGGER POWER MECHANISM

[75] Inventor: Erwin F'Geppert, Oakland, Mich.
[73] Assignee: The United States of America as represented by the Secretary of the Army, Washington, D.C.

[21] Appl. No.: 690,014
[22] Filed: Jan. 9, 1985
[51] Int. Cl.[4] B60S 9/04
[52] U.S. Cl. 280/764.1; 172/484; 172/490
[58] Field of Search 280/764.1, 765.1, 766.1, 280/763.1, 6 R, 6.1, 414.5; 172/490, 484, 417, 829, 307; 212/189; 254/45–47, 418, 426

[56] References Cited

U.S. PATENT DOCUMENTS

| | | | |
|---|---|---|---|
| 1,299,676 | 4/1919 | Campbell | 172/484 |
| 3,486,567 | 12/1969 | Weaver | 172/484 |
| 3,764,162 | 10/1973 | Rawlings | 280/764.1 |
| 3,912,288 | 10/1975 | F'Geppert | 254/423 |

FOREIGN PATENT DOCUMENTS

| | | | |
|---|---|---|---|
| 1058295 | 5/1959 | Fed. Rep. of Germany | 172/490 |
| 534508 | 3/1922 | France | 172/490 |

*Primary Examiner*—John J. Love
*Assistant Examiner*—Joseph G. McCarthy
*Attorney, Agent, or Firm*—John E. McRae; Robert P. Gibson; Peter A. Taucher

[57] ABSTRACT

An outrigger construction for raising and supporting selected portions of a trailer or other wheeled vehicle, e.g. to provide a level stable vehicle attitude while the vehicle is located on sloping terrain. The principal feature of interest is a low-cost power mechanism for operating the outrigger. In one case the power mechanism comprises a winch-cable system. In another instance the power mechanism comprises a level-link assembly.

7 Claims, 8 Drawing Figures

OUTRIGGER POWER MECHANISMCL GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to outrigger mechanisms for raising or lowering a trailer or other wheeled vehicle between a position supported by the vehicle wheels and a position supported by the outrigger mechanisms. U.S. Pat. No. 3,912,288 issued Oct. 14, 1975 shows an outrigger-vehicle assembly suited for use of the invention.

In FIG. 2 of the referenced patent there is shown an outrigger 16 adapted to be moved between a stored position (indicated by dashed lines) and an operating position (full lines). The power mechanism for operating the outrigger comprises a motor 36 and ball screw 38. In practice the motor-ball screw unit has proven to be a relatively expensive piece of apparatus.

The exact reasons for the high purchase price of the motor-ball screw are not entirely known. It is believed that one cost element is the need for precise tolerances on the ball screw surfaces; also, the ball and screw surfaces are required to be hardened. The balls and screw are subjected to high loads and speeds. Precision manufacture is apparently necessary to prevent localized high load unit forces and resultant premature wear.

The present invention is directed to a relatively low cost power mechanism for operating a vehicle outrigger between its stored position and its operating position. In its preferred form the power mechanism comprises a motor-operated winding drum having a cable wound thereon; the free ends of the cable connect with anchorages at spaced points on a leg structure that forms part of the outrigger. The cable is oriented so that rotation of the drum in one direction causes the cable to pull the outrigger to its operating position; drum rotation in the opposite direction causes the cable to pull the outrigger to its stored position.

The invention has for its principal object the attainment of outrigger power mechanism that is manufacturable at relatively low cost. The mechanism can be built to relatively loose (coarse) tolerances; no precision fits or surfaces are required.

THE DRAWINGS

FIGS. 1 and 2 illustrate in semi-diagrammatic fashion a vehicle outrigger assembly adapted to utilize the present invention. FIG. 1 shows the outrigger engaged with the terrain surface but prior to exertion of a lifting force on the vehicle. FIG. 2 shows the outrigger assembly in condition for exerting a lift force on the vehicle.

THE DRAWINGS IN GREATER DETAIL

Figure 1:
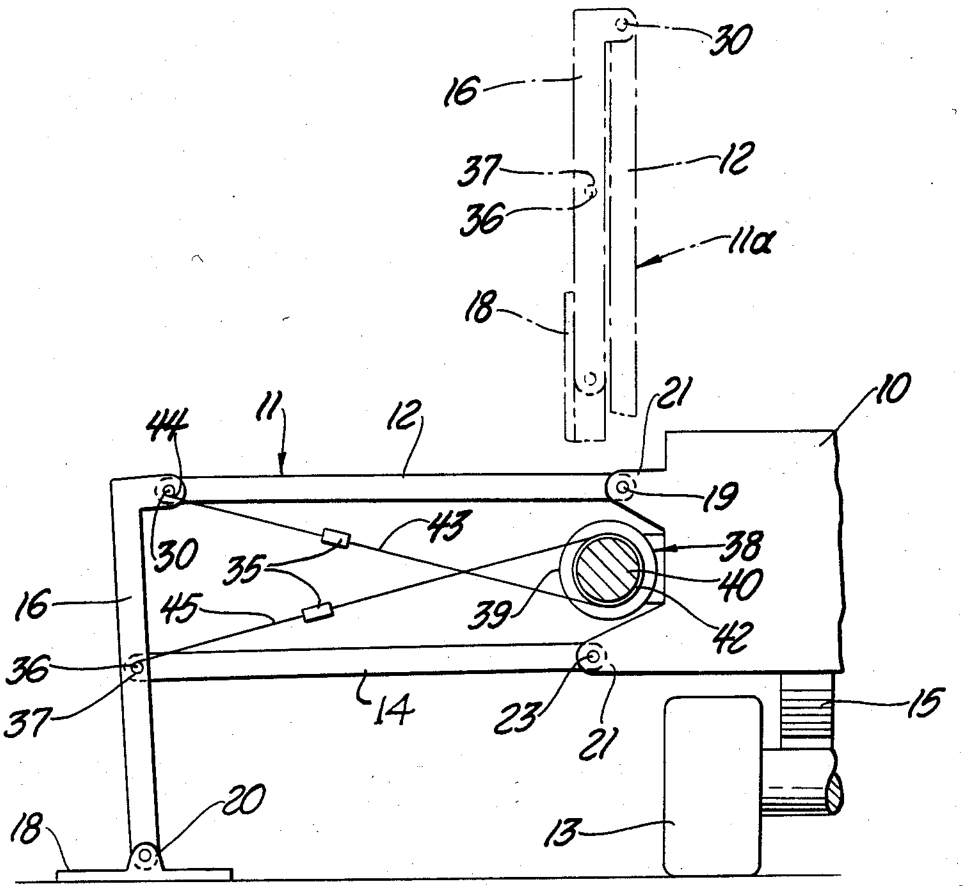
Figure 2:
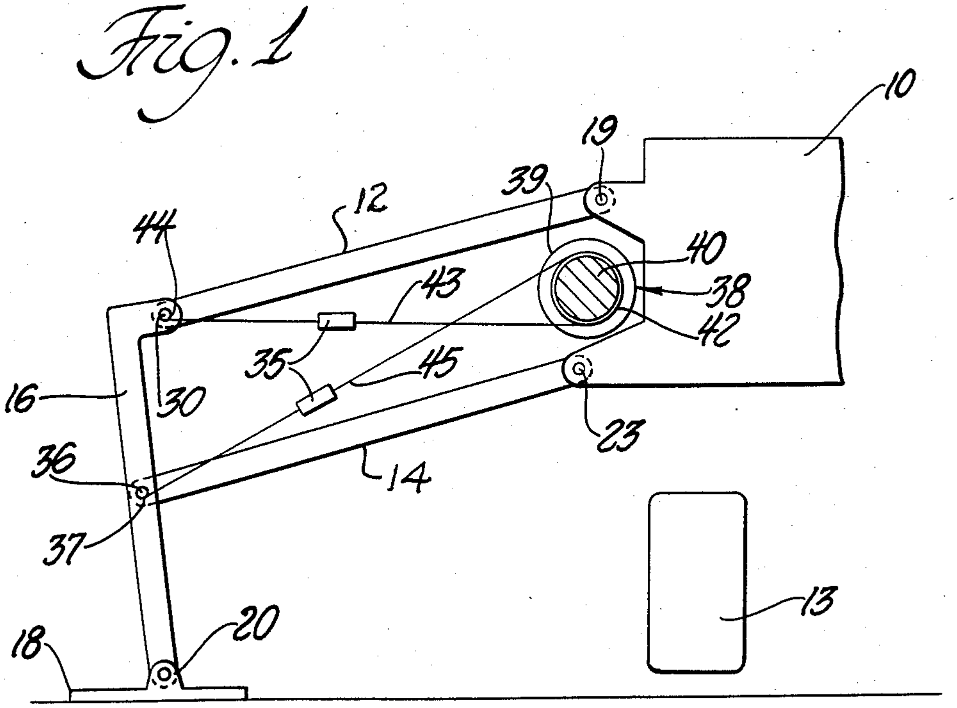

FIGS. 1 and 2 illustrate an outrigger 11 attached to a trailer 10. Normally the trailer is supported on road wheels 13 via leaf spring suspension means 15. During normal-run periods the outrigger is oriented in an upright stored position indicated by dashed lines **11*a* in FIG. 1**.

FIGS. 1 and 2 show one outrigger. In practice the vehicle will have four outriggers located at its four corners, as indicated generally in FIG. 1 of the previously mentioned U.S. Pat. No. 3,912,288. Each outrigger is adjusted or operated by means of a separate electric motor disposed on (within) the outrigger.

As shown in FIGS. 1 and 2, the outrigger comprises a leg 16 having a pivotal connection 20 with a terrain-engageable pad 18. The leg is connected to vehicle 10 by means of an upper arm 12 and lower arm 14. Upper arm 12 has a first pivotal connection 30 with leg 12 and a second pivotal connection 19 with the vehicle. Lower arm 14 has a third pivotal connection 36 with leg 16 and a fourth pivotal connection 23 with the vehicle.

Arms 12 and 14 are of equal length. Also, pivotal connections 19 and 23 are spaced the same distance as pivotal connections 30 and 36. Accordingly, leg 16 and the two arms 12 and 14 form a parallelogram linkage.

The outrigger is operated between its stored position **11*a* (dashed lines in FIG. 1) and its operating positions (full lines in FIGS. 1 and 2) by a power mechanism 38. The power mechanism comprises an electric motor 39 having a driving connection with a winding drum 40. A speed reducer means (not visible in FIG. 1) is arranged between the motor and drum 40** so that the drum rotates as a substantially rotational speed than the motor. For example, the motor may operate at a relatively high speed of approximately 2000 r.p.m., whereas the drum operates at about 2 r.p.m.

The exact motor speed is relatively unimportant. The drum speed should be held within close limits in order to achieve an outrigger motion cycle within a reasonably short time period without overshooting a desired final position of the vehicle. The so-called "final position" of the vehicle is dictated by the vehicle function.

As indicated in the above-referenced U.S. Pat. No. 3,912,288, the outriggers can be used to support the vehicle (trailer) in a level attitude, irrespective of the terrain contour (sloping in one direction or another). To achieve a level attitude of the vehicle the various outriggers are selectively actuated so that vehicle weight is transferred from wheels 13 to the outriggers. The final "level attitude" position is ascertained by reference to any suitable level indicator mounted on the vehicle. Manual control of the process involves selective actuation of control switches associated with individual ones of motors 39. The switches are located in a panel on the vehicle.

The motor-operated drum 40 has a steel cable wound thereon a number of turns, e.g., seven or eight turns. The number of turns is selected to prevent slippage of the cable on the drum. If deemed necessary, the cable can be anchored to the drum by a clamp (not shown) applied to one of the cable turns. One end portion 43 of the cable extends from the drum to a first cable attachment 44 located on leg 16 at or near pivot connection 30. The other end portion 45 of the cable extends from the drum to a second cable attachment 37 located on leg 16 at or near pivot connection 36. Each cable portion 43 or 45 has a turnbuckle 35 at some point along its length for maintaining a desired tension in the cable system.

The drum-cable system operates so that rotation of the drum in one direction moves the outrigger from its operating position (full lines in FIG. 1) to its stored position (dashed lines in FIG. 1). Rotation of the drum in the opposite direction moves the outrigger from its stored position to its operating position. As seen in FIG. 1, clockwise motion of the drum moves the outrigger to the stored position. Counter clockwise motion of the drum moves the outrigger to its FIG. 1 operating position; continued counter clockwise drum motion causes the outrigger to exert a lift action of the vehicle, as shown in FIG. 2.

Outrigger motion is achieved as a pulling motion of the cable on cable attachment 44 or cable attachment 37. For example, clockwise motion of drum 40 causes cable portion 45 to be drawn onto the drum, thereby pulling cable attachment point 37 toward the drum axis; simultaneously cable portion 43 winds off the drum.

It will be appreciated that the parallelogram linkage constrains attachment point 37 against motion directly toward the drum 40 axis. Instead, attachment point 37 is caused to move in an arc, e.g. between the FIG. 1 full line position and the FIG. 1 dashed line position. In this connection, it will be seen that the spacing between attachment point 37 and the drum 40 axis is greater when the outrigger is in the FIG. 1 full line position and less when the trigger is in the FIG. 1 dashed line position.

When the outrigger is in its FIG. 1 dashed line position drum 40 may be rotated in a counterclockwise direction so that cable portion 43 exerts a pulling action on attachment point 44. The outrigger is thereby pulled down to the FIG. 1 operating position (full lines). Continued counterclockwise rotation of the drum causes the outrigger to lift the vehicle from the FIG. 1 position to the FIG. 2 position. Vehicle weight is transferred from road wheel 13 to the outrigger.

During outrigger motion one cable portion (43 or 45) is under tension; the other cable portion (45 or 43) is in a slack condition. The slack cable portion does not enter into the outrigger movement process.

As previously noted, the vehicle would usually be equipped with a plurality of outriggers at spaced locations around its periphery, e.g. one outrigger at each of the four vehicle corners. To achieve a level vehicle condition (supported on the outriggers) all four outriggers would initially be operated from the stored condition (dashed lines in FIG. 1) to the operating position (full lines in FIG. 1). All outriggers would then be operated just enough to transfer the vehicle weight onto the outriggers. Final "level attitude" positioning of the vehicle would be achieved by selective actuation of the outrigger motors. Motor control is by means of manual on-off switches, one switch for each motor. No motor speed control circuitry is needed.

Figure 5:
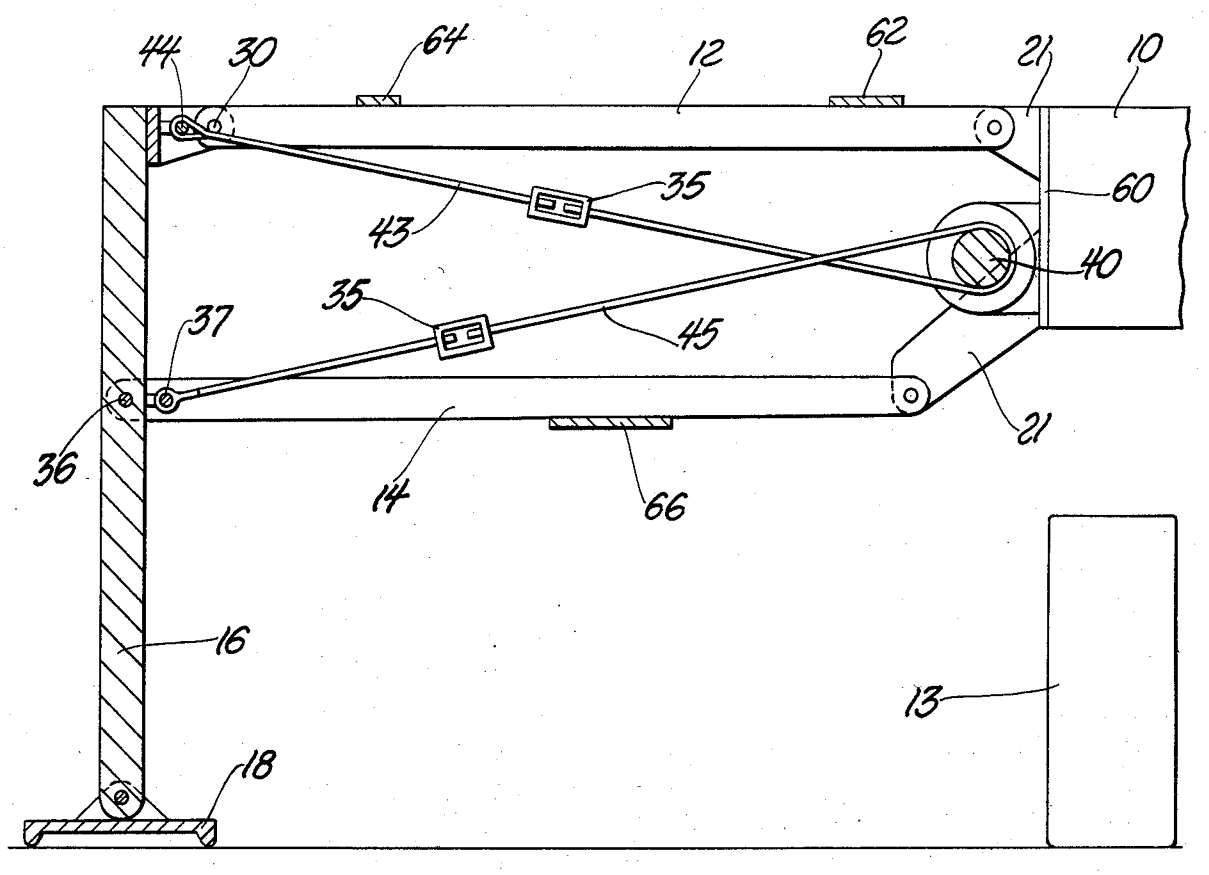
FIG. 5 is a view similar to FIG. 1, but enlarged to show details not visible in FIG. 1.
Figure 6:
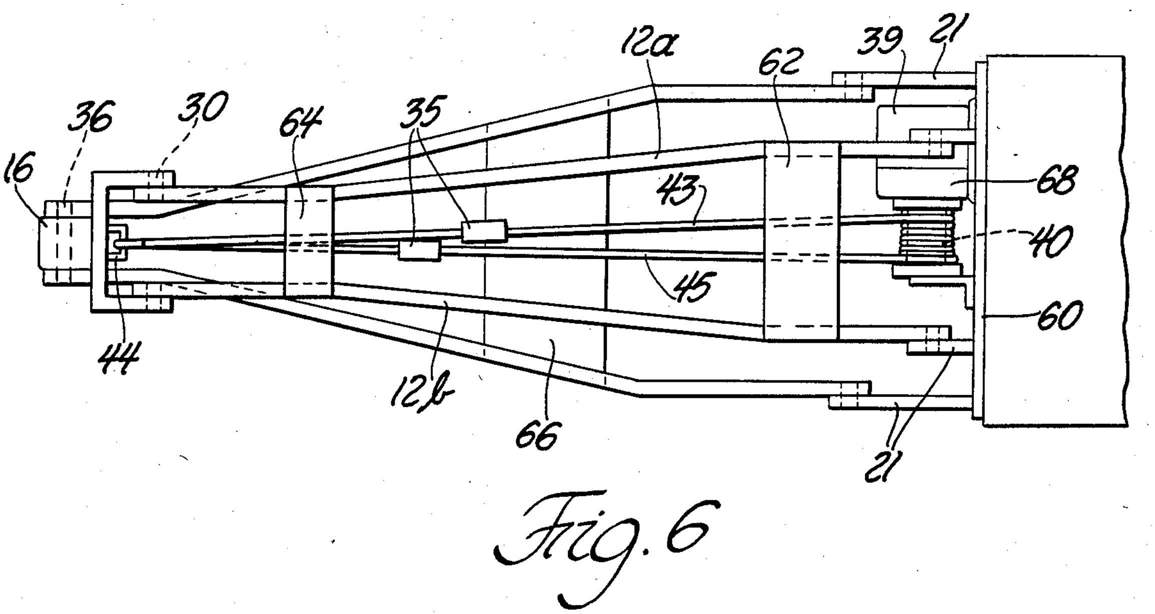
FIG. 6 is a top plan view of the FIG. 5 outrigger structure.

FIGS. 1 and 2 illustrate one embodiment of the invention in semi-diagrammatic fashion. Some structural relationships not apparent in FIGS. 1 and 2 are shown in FIGS. 5 and 6. A steel plate 60 is attached to the vehicle for locating the various support ears 21. Upper arm 12 is comprised on two spaced bars **12*a* and 12*b* interconnected by cross pieces 62 and 64. Lower arm 14 is comprised of two spaced bars 14*a* and 14*b* interconnected by cross piece 66**.

Cable attachments 44 and 37 are shown in FIGS. 5 and 6 as U-shaped bails; the associated ends of cable portions 43 and 45 may be loops encircling the bails.

The motor-drum assembly may be mounted on plate 60. The previously-referenced speed reducer is shown at 68. The speed reducer is physically disposed between the motor and drum in an "axial aligned" relationship. The motor-drum assembly is disposed within the axial space circumscribed by arm elements **14*a* and 14*b***, whereby the arms can move without striking the motor-drum assembly.

Figure 7:
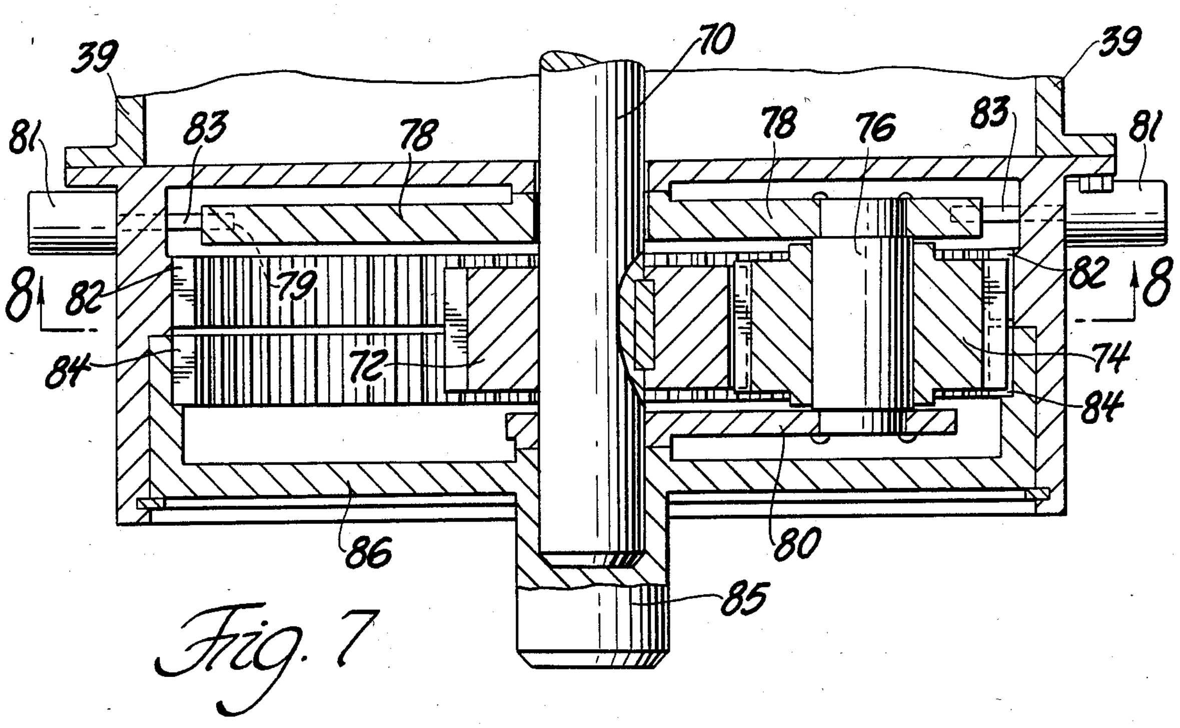
FIG. 7 is a sectional view taken through a speed reducer used in the FIG. 5 assembly.
Figure 8:
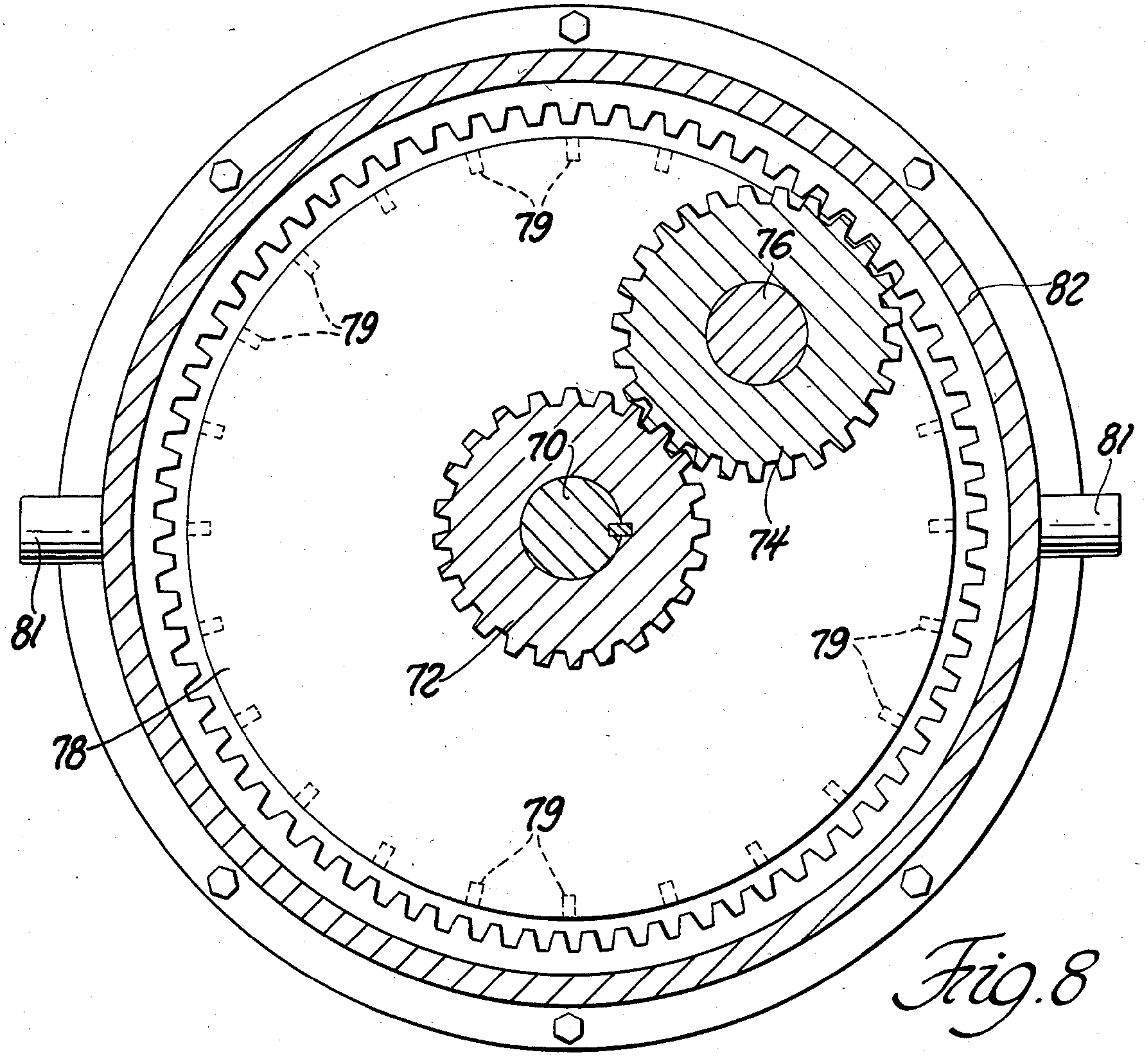
FIG. 8 is a sectional view on line 8—8 in FIG. 7.

Specific detail of speed reducer 68 is not a direct feature of this invention. However, the selected speed reducer must be relatively small to fit in the available space, while at the same time achieving a large speed reduction (e.g. 1000 to 1). FIGS. 7 and 8 illustrate one speed reducer design that I believe would be suitable.

The motor output shaft 70 is affixed to a sun gear 72 that meshes with a planet gear 74. Gear 74 is freely rotatable on a shaft 76 that extends between two support arms 78 and 80; each support arm is freely swingable on shaft 70, whereby the associated gear 74 can maintain desired tooth contact with gear 72 while orbiting around the shaft 70 axis.

Gear 74 is in simultaneous mesh with two internal ring gears 82 and 84. One ring gear has one tooth more then the other ring gear, e.g. if gear 82 has eighty teeth gear 84 might have eighty one teeth. Gear 82 is a fixed gear attached to the motor 39 housing. Gear 84 is a movable gear attachable to the winding drum (not shown). The winding drum may be affixed to gear 84 by connection to stub shaft 85 or by bolt-on connection to the gear face area 86.

The pitches of the teeth on gears 82 and 84 are very slightly different, due to the fact that one gear has one more tooth than the other. During one complete orbit of gear 74 around the circumference of ring gears 82 and 84 the movable gear 84 will advance about 1/80th of a revolution (due to the restraint imposed by gear 82). If the movable ring gear has one more tooth than the stationary ring gear the movable ring gear will move in the same direction as planet gear 74; if the movable ring gear has one tooth less than the stationary ring gear the movable ring gear and planet gear will rotate in opposite directions.

Each orbit of gear 74 will require a time period related to the relative diameters of gear 72 and 84. For example, if the gear 72 diameter is one tenth of the gear 84 diameter then ten rotations of gear 72 will be required to achieve one complete orbital cycle of gear 74 (around gear 72).

Taking into account the two speed reductions (due to the ring gear tooth relationship and due to the gear diameter ratios) a relatively large overall speed reduction be achieved. The exact speed reduction from shaft 70 to speed reducer output shaft 85 may be calculated by use of the following equation:

$$R=1/(C/A)+1\cdot D-C/D$$

where R is the speed reduction ratio,

C is the number of teeth on gear 82,

D is the number of teeth on gear 84, and

A is the number of teeth on gear 72.

The winding drum will operate at a low r.p.m. even though motor 39 operates at a reasonably high speed. Preferably motor 39 is a standard shelf item available at reasonable cost.

During a complete motion sequence of the outrigger, from its stored position (dashed lines in FIG. 1) to its final position (at or near the FIG. 2 position) the winding drum will usually rotate less than one revolution (unless the drum is made to a very small diameter). Hence, it is necessary that the drum operate at a relatively slow speed if the human technician is to have a reasonably close control on the outrigger motion, i.e., avoid overshooting or undershooting a desired vehicle attitude. The parameters on winding drum speed dictate the need for a speed reducer between the motor and winding drum.

It is desirable to have a brake or lock mechanism for absorbing load forces when the outrigger is in its end position (especially the FIG. 2 loaded position). FIGS. 7 and 8 illustrate one form of brake that might be employed. Arm 78 is built as a circular disc; a series of notches 79 are formed around the disc periphery. Two or more solenoids 81 are positioned on stationary member 82; spring-urged solenoid plungers 83 can enter into the aligned notches 79 when the solenoids are de-energized.

Solenoids 81 would be energized/de-energized substantially in syncrhonism with motor 39, such that whenever the motor is de-energized the power mechanism will be locked against movement or slippage due to load forces.

Figure 3:
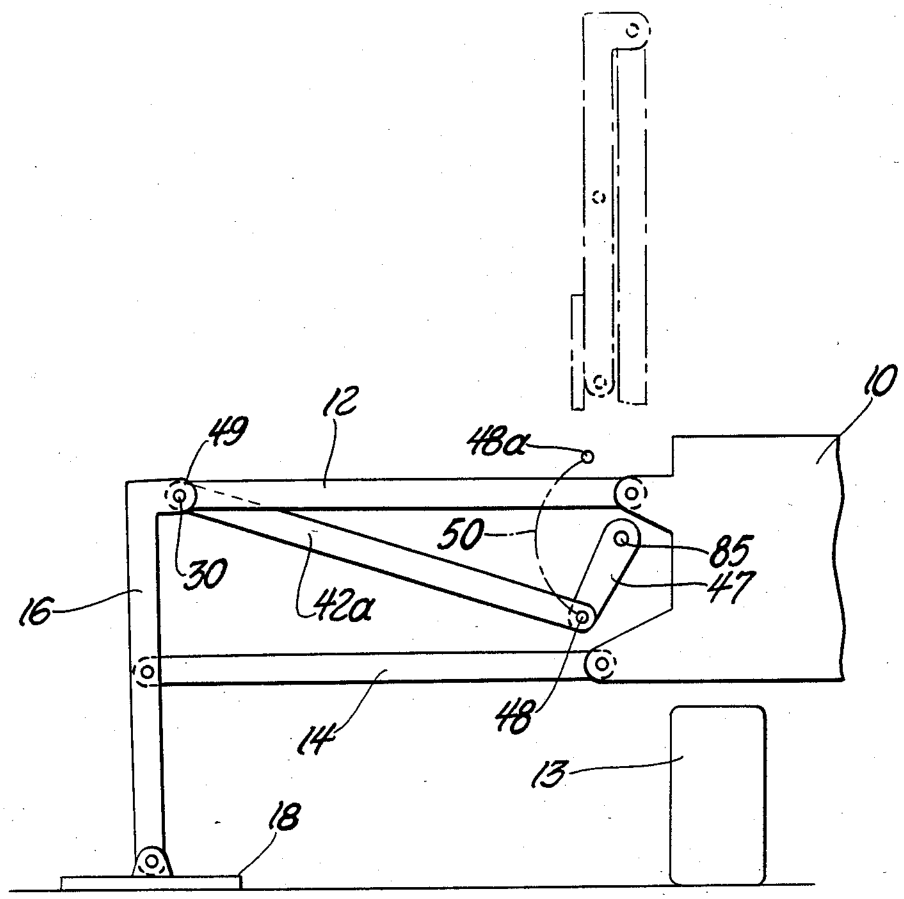
FIGS. 3 and 4 are views similar to FIGS. 1 and 2, but illustrating a second embodiment of the invention.
Figure 4:
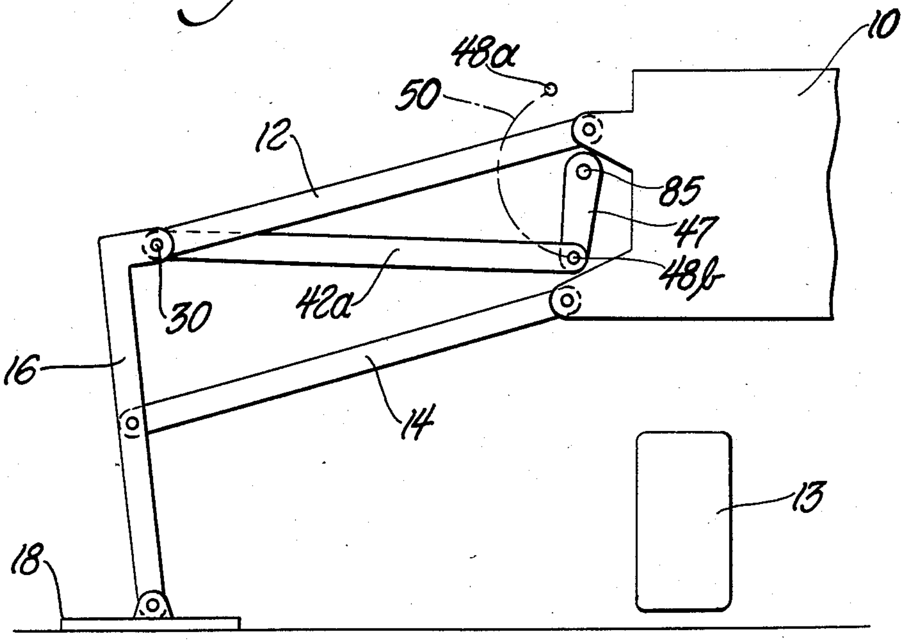

It is believed possible to practice the invention using some structural variations. FIGS. 3 and 4 illustrate one possible alternate design. The outrigger shown in FIGS. 3 and 4 is similar to that previously described. Similary, the motor and speed reducer may generally be the same as the corresponding assembly shown in FIGS. 7 and 8. However, instead of a winding drum and cable assembly, there is utilized a cranklink assembly. Crank 47 is affixed to the aforementioned stub shaft 85 (FIG. 7) for arcuate motion. Link 42*a* has a pivot connection 48 with crank 44, and a pivot connection 49 with leg 16. Connection 49 is coincident with (or part of) pivotal connection 40 that interconnects leg 16 and arm 12.

When the outrigger is in its stored position pivot connection 48 is in its dashed line position 48*a*. Counterclockwise motion of crank 47 (by the motor-speed reducer assembly) moves pivot connection 48 through arc 50 to position 48*b*. At that point the outrigger is bearing the vehicle weight. Reverse motion of crank 47 in a clockwise direction lowers the verhicle and moves the outrigger to its stored position.

The principal advantage of the outrigger actuator mechanism (FIG. 1 or FIG. 3) is the lack of precision surfaces. Neither the cable-drum mechanism nor the crank-link assembly (FIG. 3) require precise manufacturing tolerances. Hopefully the described mechanisms will be chearper to manufacture than the ball-screw units they are designed to replace.

The invention comprehends the use of a rotary member 40 or 47 located between pivotal connections 19 and 23 for limited arcuate motion at a relatively slow speed (compared to motor speed). A force-applying means extends between the rotary member and leg 16 of the outrigger. In FIGS. 1 and 2 the force-applying means takes the form of a cable 42. In FIGS. 3 and 4 the force-applying means takes the form of a line 42*a*.

I wish it to be understood that I do not desire to be limited to the exact details of construction shown and described for obvious modifications will occur to a person skilled in the art, without departing from the spirit and scope of the appended claims.

I claim:

1. In association with a wheeled vehicle having plurality of outriggers at spaced locations around its periphery for supporting the vehicle in a level attitude, with the vehicle weight removed from the wheels; each outrigger comprising a leg, an upper arm, and a lower arm; said upper arm having a first pivotal connection with the leg and a second pivotal connection with the vehicle; said lower arm having a third pivotal connection with the leg and a fourth pivotal connection with the vehicle; said arms being of equal length; the pivotal connections being spaced so that the arm-leg assembly forms a parellelogram linkage; said arm-leg assembly being movable between a stored position wherein the arms extend from the vehicle generally vertically upward, and an operating position wherein the arms extend from the vehicle generally horizontally and outwardly: the improvement comprising a novel power mechanism for moving the arm-leg assembly between its stored position and its operating position; said power mechanism comprising a rotary cable support carried by the trailer, a first cable attachment means carried by the leg near said first pivotal connection, a second cable attachment means carried by the leg near said third pivotal connection, a first cable element extending from the cable-support to the first cable attachment means, a second cable element extending from the cable support to the second cable attachment means; said cable elements being oriented so that rotary motion of the cable-support in one direction causes said first cable element to pull the first cable attachment means toward the cable-support axis for thereby moving the arm-leg assembly toward its operating position, and rotary motion of the cable-support in the other direction causes said second cable element to pull the second cable attachment means toward the cable support axis for thereby moving the arm-leg assembly toward its stored position.

2. The improvement of claim 1: said cable support comprising a rotary drum; said cable elements being portions of a single cable that has portions thereof wound around the drum.

3. The improvment of claim 2: said rotary drum being located generally midway between the second and fourth pivotal connections.

4. The improvement of claim 3: said rotary drum having its rotational axis parallel to the axes defined by the second and fourth pivotal connections.

5. The improvement of claim 4: said power mechanism further comprising an electric motor and speed reducer means operatively connected to the rotary drum so that drum rotational speed is materially less than motor speed.

6. The improvement of claim 5: said motor and drum being mounted for rotation around a common rotational axis.

7. The improvement of claim 6: the speed reducer means comprising a circular housing having approximately the same diameter as the motor; the speed reducer means being physically disposed between the motor and drum.

* * * * *